USOO5565401A

United States Patent [19]
Le Page et al.

[11] Patent Number: 5,565,401
[45] Date of Patent: Oct. 15, 1996

[54] CATALYST COMPRISING AN ASSEMBLY OF AT LEAST ONE WIRE AND ITS USE IN COMBUSTION OR IN POST-COMBUSTION

[75] Inventors: Jean-Francois Le Page, Rueil Malmason; Gil Mabilon, Carrieres sur Seine, both of France

[73] Assignee: Institut Francais du Petrole, Rueil Malmaison, France

[21] Appl. No.: 274,522

[22] Filed: Jul. 31, 1994

[30] Foreign Application Priority Data

Jul. 13, 1993 [FR] France .................................. 93 08742

[51] Int. Cl.$^6$ .............................. B01J 21/04; B01J 35/00
[52] U.S. Cl. ...................... 502/439; 502/527; 423/215.5
[58] Field of Search ..................... 502/439, 527

[56] References Cited

U.S. PATENT DOCUMENTS

| | | | |
|---|---|---|---|
| 3,897,366 | 7/1975 | Nakamura | 502/439 |
| 4,220,625 | 9/1980 | Toh et al. | 502/527 |
| 4,271,044 | 6/1981 | Fratzer et al. | |
| 4,287,097 | 9/1981 | Fratzer et al. | |
| 4,330,436 | 5/1982 | Cairns et al. | |
| 4,388,275 | 6/1983 | Fratzer et al. | |
| 4,397,772 | 8/1983 | Noakes et al. | |
| 4,464,482 | 8/1984 | Bird et al. | |
| 5,162,287 | 11/1992 | Yoshimoto et al. | 502/439 |
| 5,266,279 | 11/1993 | Haerle | |

FOREIGN PATENT DOCUMENTS

| | | |
|---|---|---|
| 53884 | 6/1982 | European Pat. Off. . |
| 505832 | 9/1992 | European Pat. Off. . |
| 2029720 | 3/1980 | United Kingdom . |
| 2065494 | 7/1981 | United Kingdom . |
| 2122914 | 1/1984 | United Kingdom . |
| 2045637 | 11/1990 | United Kingdom . |

OTHER PUBLICATIONS

The American Heritage Dictionary, Second Ed. (1982).

*Primary Examiner*—Glenn A. Caldarola
*Attorney, Agent, or Firm*—Millen, White, Zelane, & Branigan, P.C.

[57] ABSTRACT

The invention relates to a catalyst comprising an assembly of at least one wire that comprises, in % weight, between 60 and 90% iron, and between 10 and 25% chromium, at least one metal selected from the group formed by platinum, rhodium, palladium, ruthenium, iridium, gold and silver having been deposited on the assembly, the outside contour of the cross-section of the wire being included in a ring whose area is between a circle with a 90 μm diameter and a circle with a 5 mm diameter, the length of the wire being at least equal to 20 cm, and the assembly being mechanically integral, the wire having been subjected to a prior depositing of aluminum, in a proportion going up to 10% by weight in relation to the weight of the wire, followed by a redrawing.

A preferred assembly corresponds to a knitted structure (1) in the shape of a sock.

9 Claims, 1 Drawing Sheet

U.S. Patent
Oct. 15, 1996
5,565,401
FIG.1
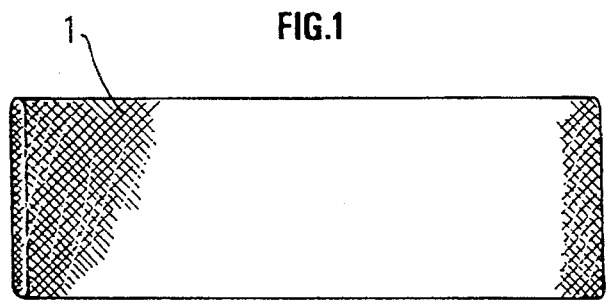
FIG.2
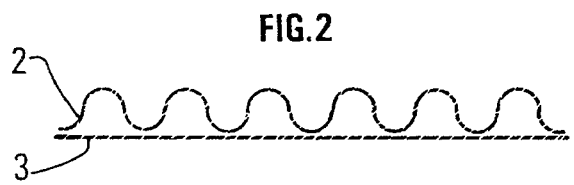
FIG.5
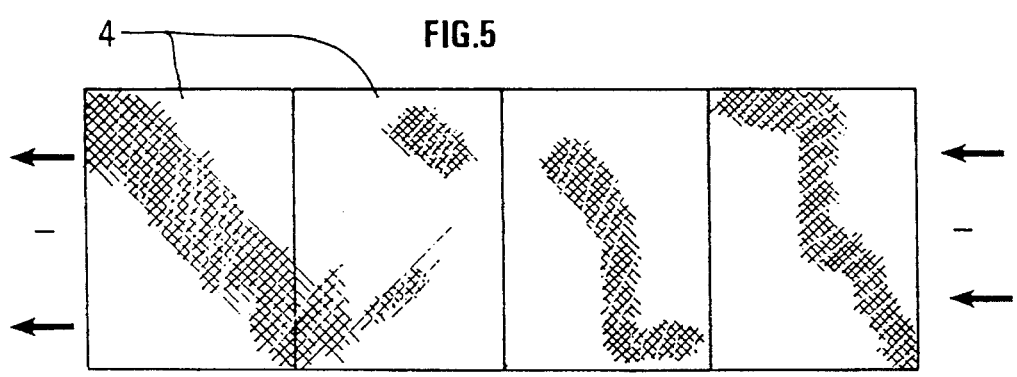
FIG.3
FIG.4
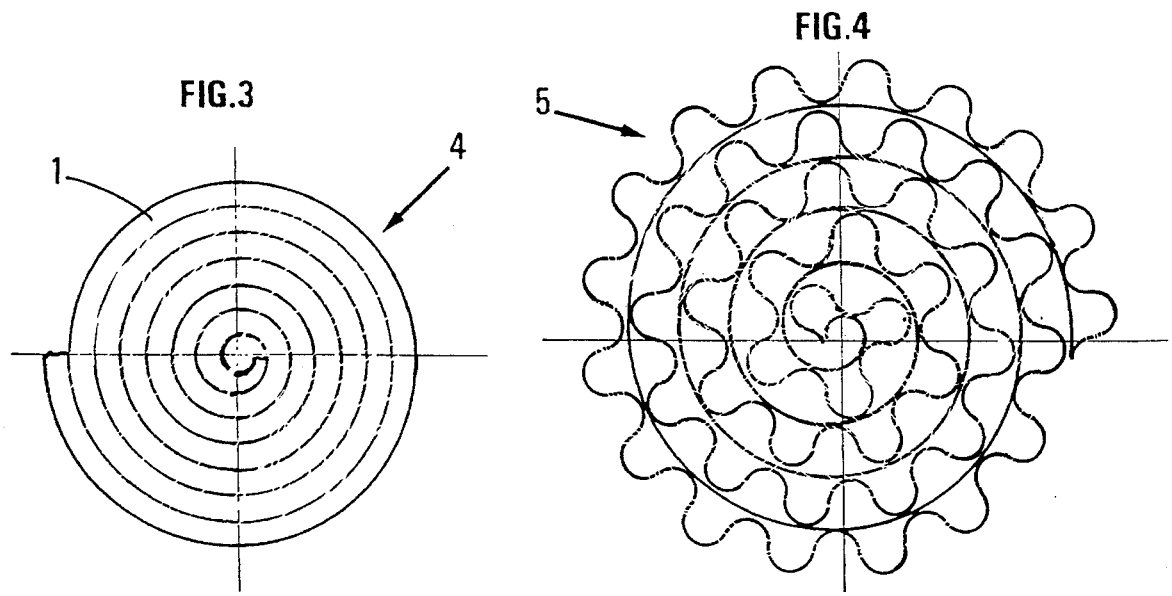

CATALYST COMPRISING AN ASSEMBLY OF AT LEAST ONE WIRE AND ITS USE IN COMBUSTION OR IN POST-COMBUSTION

SUMMARY OF THE INVENTION

The invention relates to a catalyst comprising an assembly of at least one wire containing iron, chromium and aluminum, on which at least one metal selected from the group formed by platinum, rhodium, palladium, ruthenium, iridium, gold and silver is deposited, the assembly consisting of a joining of the wire or wires in such a way that said joining forms a mechanically integral unit which has been shaped in an organized way, i.e., in a non-random way. Thus, if the assembly comprises at least two wires, each wire is in contact with at least one other wire in an organized and integral way.

The invention relates preferably to the case where said assembly has been performed by knitting and/or weaving.

The invention also relates to the use of said catalyst for combustion or post-combustion catalysis. Combustion or post-combustion catalysts comprise ceramic-based supports which have the advantage of exhibiting considerable resistance to temperature (up to 1400° to 1500° C.) but slight mechanical strength, or metal-based supports which have the advantage of exhibiting considerable mechanical strength but a somewhat lower resistance to temperature (up to 1200° to 1300° C. only).

The metal-based supporting substance can be in the form of metal strips that are shaped either by winding, or by stacking, so as to form a substrate which generally undergoes a brazing or soldering then coating by at least one oxide such as an aluminum oxide or a cerium oxide before the depositing of at least one metal which catalyzes the combustion or post-combustion reactions.

The metal-based support as described in patents U.S. Pat. No. 4,330,436 and U.S. Pat. No. 4,397,772 consists of at least one wire with a relatively smooth surface and with an open three-dimensional shape (turn or helix), contact among the different parts of the wire being avoided as much as possible and one layer comprising at least one catalytic element having been partially deposited on the surface of the shaped wire. The wires are joined so that the neighboring wires are not interlaced, and the joining of the juxtaposed wires is distributed in a container which has gas intake and outlet openings, the dimensions of each wire being very small in relation to the dimensions of the container. A preferred shaping of wire is the helical shape which makes possible several later assembly options.

The catalyst used in this invention comprises a support comprising at least one wire having a base of iron, chromium and aluminum on which at least one metal possessing a catalytic activity in combustion or in post-combustion has been deposited. Said metal is selected from the group formed by platinum, rhodium, palladium, ruthenium, iridium, gold and silver. The depositing of said metal can optionally be preceded or accompanied by the depositing on said assembly of a layer of porous materials known as a coating layer consisting essentially of at least one compound selected from the group formed by aluminum oxides, cerium oxides, titanium oxides, silicon oxides, vanadium oxides, said layer comprising optionally at least one compound of an element selected from the group formed by lanthanum, barium, iron and zirconium.

The wire used for the assembly comprises, generally by % weight from about 60 to 90%, preferably about 70 to 80% iron, from about 10 to 25%, preferably about 15 to 23% chromium, up to about 10%, preferably up to about 6% aluminum. The outside contour of the cross-section of the wire is included in a ring defined as the area between a circle with about a 90 μm diameter and a circle with about a 5 mm diameter. Preferably, the wire has a section of approximately circular shape, but it can also have a section of more or less flat shape, for example of approximately elliptical shape. In the case of an approximately elliptical shape, the long axis of the ellipse thus has a length at most equal to about 5 mm. The wire has a length at least equal to about 20 cm, preferably at least equal to about 50 cm, so as to be able to perform the assembly. In the case where the assembly comprises at least two wires, each wire included in the assembly can be identical to or different from each of the other wires included in the assembly.

Assembly of wires means the joining of at least one wire, in such a way that said joining forms a "mechanically integral unit", i.e., a unit formed of mechanically attached wires, which has been shaped in an organized way, i.e., in a non-random way. It can be the joining of at least two wires together so that each wire is in contact with at least one other wire in an organized way, i.e., in a non-random and integral way, and so that said joining of wires forms a mechanically integral unit. But it is also possible that the assembly consists of a single wire to which a two- or three-dimensional organized structure is given that is mechanically integral, thanks to a knitting for example.

In the case where the assembly comprises at least two wires, it consists therefore mainly of a shaping of the unit of the previously separate wires in such a way that adjacent wires, i.e., wires that are at least partially in contact, can interlace. A simple juxtaposition of separate wires, each wire being optionally previously shaped, for example in the shape of a turn or helix, such that it is almost ruled out that adjacent wires can at least partially interlace, therefore does not enter into, i.e., is preferably excluded from, the context of this invention.

One of the preferred assemblies of this invention is the weaving of at least one wire so as to obtain a fabric that is a more or less plane organized structure as is known in the field of textiles. In the case of the use of at least two wires, this weaving can be performed for example with wires that are approximately identical, straight or wavy, and approximately of the same diameter in the case of wires with an approximately circular section. It is then possible to subject said fabric to at least one modification such as a partial embossing, i.e., a molding so that the fabric, in a more or less plane shape, exhibits apparent asperities or roughness on at least one of its faces, these asperities or roughness being able to have any shape. It is possible that the assembly is only partially a woven structure.

Another of the preferred assemblies of this invention is the knitting of at least one wire so as to obtain a structure having two or three dimensions. For example, it is possible to obtain a relatively planar structure or a structure in the shape of a "sock," i.e., a structure that can at least partially cover a cylindrical shape. In the case of the use of at least two wires, this knitting can, for example, be performed with wires that are approximately identical, straight or wavy, and approximately of the same diameter in the case of wires with an approximately circular section. It is possible that the assembly is only partially a knitted structure.

For the two preferred assemblies of this invention, i.e., weaving and knitting, in the case of the use of at least two wires, the wires used preferably have a cross-section close in size. Actually, the outside contour of each wire cross-section can be considered as included in a ring defined as the area between a small diameter circle and large diameter circle. To say that the wires have a "cross-section close in size" means that the following two characteristics are met:

1) the length of the smallest diameter of small circle of wire belonging to the unit of the wires used is not less than 50% of the length of the largest diameter of small circle of wire belonging to said unit, and, 2) the length of the smallest diameter of large circle of wire belonging to said unit is not less than 50% of the length of the largest diameter of large circle of wire belonging to said unit. It is furthermore possible that, during shaping, wires of section close, but different, in size are alternated; in the case of weaving, for example, it can be preferable, to assure a better distribution of gas during use, to have a fabric comprising periodically (one time in five, for example) a wire of section different in size from the other wires which have approximately identical sections.

In the case of the use of at least two wires, any combination of wires during shaping such that any wire is at least joined to another wire in an integral way is included in this invention.

The assembly according to the invention is preferably preceded by a deposit of aluminum on at least a portion of said assembly. The aluminum deposit is performed on a wire of above-defined composition, preferably degreased and dried. The wire, preferably clean, is immersed continuously in a molten aluminum bath, then preferably redrawn through a die. These operations make it possible to coat the core of the wire with a layer of 10 to 50 μm of aluminum. The redrawing can, in particular, have the effect of causing a beginning of the anchoring of the aluminum in the upper layer of the wire. It can be advantageous to cause a deeper diffusion of the aluminum toward the core of the wire. To do this, the wire is heated to a temperature that can go up to about 900° to 1000° C., preferably in an inert or reducing atmosphere.

The depositing of at least one metal having catalytic activity is performed by any process known to a person skilled in the art, e.g., by impregnation. It is possible, for example, to impregnate by means of a solution with at least one metal compound selected from the group formed by platinum, rhodium, palladium, ruthenium, iridium, silver and gold such as, for example, dinitrosodiamino platinum, palladium nitrate, palladium nitrate diamine, dinitrosodiamino palladium, rhodium nitrate, trinitrosotriamino rhodium. The impregnation is performed by immersing the assembly in a solution comprising at least one compound as described above, followed by drainage to eliminate the excess solution and by a heat treatment at a maximum temperature generally between 250° and 650° C., preferably between 400° and 600° C.

To increase the total concentration of metal deposited to improve the effectiveness of the catalyst, it can be preferable to deposit on the assembly, before or during the depositing of metal as described above, a layer of porous materials having a base of at least one compound selected from the group formed by aluminum oxides, cerium oxides, titanium oxides, silicon oxides, vanadium oxides, and optionally at least one compound of an element selected from the group formed by lanthanum, barium, iron and zirconium. This deposit is obtained by any process known to a person skilled in the art. It can be prior to the depositing of at least one metal having a catalytic property, but it can also be performed during said depositing of metal. It can, for example, be obtained by immersing the assembly in an aqueous suspension of at least one powder of a compound as defined above. The density, pH, viscosity of the suspension and grain size of the dry fraction are adjusted to obtain a good flow of the suspension on the wire or wires in the assembly. After immersion, the excess fraction is eliminated for example by draining, then the assembly undergoes at least one heat treatment at a maximum temperature between 350° and 800° C., preferably between 400° and 600° C. The coated assembly can be advantageously impregnated by at least one solution comprising at least one metal having a catalytic property as described above, so as to obtain a total concentration of deposited metal between 0.032 and 3 g per liter of assembly, preferably between 0.1 and 1.5 g per liter of assembly.

Prior to the metal depositing stage as described above, optionally preceded or accompanied by deposition of a porous coating layer, the assembly is optionally subjected to a series of treatment steps, in the case of the use in combustion or in post-combustion according to the invention. Several possible series of steps are envisaged as part of this invention.

A first possible series of steps comprises at least the successive steps described below.

Step a)

At least one assembly is wound so as to obtain at least one cylinder. The winding of the assembly is performed by considering that one of the edges of the assembly is the axis around which the winding is performed in the case where the assembly from which the winding is made can be roughly considered as a two-dimensional structure. In the case where said assembly is instead considered roughly as a three-dimensional structure, a winding axis is attempted to be defined which is at least a straight line tangent to said assembly; it can be preferable partly to flatten this three-dimensional structure into a structure that can be roughly considered as a two-dimensional structure before winding. For example, in the case of a knitting in the shape of a sock, it is possible to at least partially flatten the structure before proceeding to the winding, but it is also possible to proceed to the winding directly from the three-dimensional shape. Depending on the intensity of the force with which the winding is performed, the cylinder obtained has a more or less considerable voidage, i.e., open space within the cylinder such as would be occupied by gas in a gas-solid system. But it can also have a heterogeneous voidage, for example when the force with which the winding is performed has varied over time; for example, the voidage can decrease from the outside to the inside of the cylinder.

It is also possible to superpose several structures, i.e., at least two structures, so as to wind them simultaneously. According to a preferred embodiment, two fabrics can be superposed and wound simultaneously, one slightly embossed, the other almost planar; thus a support with ducts communicating with one another laterally is obtained.

The cylinder obtained preferably has either an elongated shape with a length between 50 and 250 mm and whose section has an outside contour included in a ring defined as the area between a small circle with a diameter between 60 and 100 mm and a large circle with a diameter between 100 and 200 mm, or a cylindrical shape with a length between 50 and 250 mm having a circular cross-section with a diameter between 25 and 200 mm.

Any kind of three-dimensional shape can be obtained. The name cylinder is used because of the particular shape obtained when a flat and rectangular fabric is wound around one of its edges, but the concept of a cylinder envisaged in this invention easily goes beyond the scope of the strict geometric definition of this word.

If it is considered that the voidage obtained at the end of step a) is suitable (91 to 99%, for example), it is not necessary to proceed to step b) as described below. A determination of optional voidage for a given application is conventional and routinely accomplished by one of ordinary skill in the art.

Step b) (Optional)

At least one cylinder is compressed so as to reduce the voidage to a value between 91 and 99%. It is possible that the voidage obtained decreases, even after compression, from the outside to the inside of the cylinder.

The cylindrical shape obtained after compression is preferably either an elongated shape with a length between 50 and 250 mm, and whose section has an outside contour included in a ring defined as the area between a small circle with a diameter between 60 and 100 mm and a large circle with a diameter between 100 and 200 mm, or a cylinder with a length between 50 and 250 mm having a circular section having a circular section with a diameter between 25 and 200 mm. The compression ratio, that is defined as the ratio between the volume of the assembly before compression and the volume of the assembly after compression, is between 1 and 10, preferably between 1 and 2; a compression ratio equal to 1 corresponds in fact to the case where the assembly is almost not compressed.

Step c)

At least one cylinder, optionally compressed, undergoes a treatment that aims to transform a certain part of the aluminum in the assembly, generally between 10 and 80% by weight of the aluminum in the assembly, into alumina. The treatment can be a heat treatment or a treatment by a base in aqueous solution, even an oxidation treatment in the presence of mercury; but any treatment known to a person skilled in the art can also be used. The heat treatment is essentially a treatment under dry or wet air, that can comprise two phases. The first possible phase consists in bringing the assembly to a temperature generally between 500° and 900° C., the treatment atmosphere being free of oxygen (i.e., less than $10^2$ Pa of oxygen), the total pressure being able to be less than the atmospheric pressure. In a second phase, the assembly is brought to a temperature between 800° and 1100° C., the treatment atmosphere containing more than $5\ 10^2$ Pa of oxygen. This second phase can constitute the entirety of the heat treatment. The treatment of the aluminum can also be performed by introduction of the assembly into a basic aqueous solution, with a pH between 9 and 14, preferably with a pH between 10 and 13, containing for example at least one alkaline-earth or alkaline hydroxide and/or ammonium hydroxide. The treatment is performed at a temperature between 10° and 110° C., preferably at a temperature between 20° and 50° C., for a period of 1 minute to 50 hours, preferably from 10 minutes to 20 hours. After the treatment, the assembly is advantageously washed in at least one deionized water bath.

Thus, at least one cylinder that is optionally compressed and a certain part of the aluminum of which is transformed into alumina is obtained.

Step d)

At least one cylinder that is optionally compressed and that contains alumina is introduced into a suitable tube to constitute a catalytic converter; care will be taken to eliminate the empty spaces that are too large between the wall of the tube and said cylinder, which could constitute preferential passages of gas during the use of the catalytic converter thus constituted. The axis of the cylinder and the axis of the tube are approximately parallel, preferably approximately identical.

The suitable shape of the tube is preferably either an elongated shape with a length between 50 and 250 mm, and whose section has an outside contour included in the crown defined as the area between a small circle with a diameter between 60 and 100 mm and a large circle with a diameter between 100 and 200 mm, or a cylinder with a length between 50 and 250 mm having a circular section with a diameter between 25 and 200 mm. The tube comprises an axis which is approximately an axis of symmetry, as well as two openings, placed approximately along said axis, one for the intake of the gases that are to be transformed within said tube comprising the catalyst according to the invention and the other for the outlet of said gases. In the case of the introduction of at least two cylinders into the tube, the cylinders are placed so that the axes of the tube and of the cylinders introduced into the tube are approximately parallel. In a preferred embodiment, said axes are approximately identical, i.e., the cylinders follow one behind the another along the axis of the tube. In a still more preferred embodiment, the cylinders follow one behind the other in such a way that from the opening intended for the arrival of the gases to the opening intended for the outlet of the gases, the voidage of the cylinders steadily decreases, for example from 99 to 91%, preferably from 97 to 94%. The number of cylinders thus introduced into the tube is between 2 and 10, preferably between 2 and 5. This arrangement makes it possible for the solid particles possibly present in the gases and especially for the soots not to be blocked on entry into the tube but to be able to scatter more deeply inside the catalyst. The tortuousness of the ducts in which these solid particles can progress increases the probability that they have to hit against the wires of the solid and to undergo a combustion or a catalytic post-combustion reaction. Such a device is more particularly suited for the treatment of the exhaust gases coming from diesel engines.

Step e)

The assembly contained in the tube is rendered "coherent", i.e., attached or connected as a single piece, by at least one of the following operations: brazing, soldering, sintering. Actually, the gases exert a pressure inside the tube that can cause a deformation of the structure during use. A brazing and/or soldering and/or sintering operation, according to any technique known to a person skilled in the art, makes it possible therefore to prevent an excessive deformation of the assembly during use. The brazing operation can be conducted as follows: the unit comprising the assembly and the tube is put in contact, generally at the ends of said tube, with a brazing paste or powder comprising at least 50% by weight of nickel, then said unit is treated, under vacuum, at a temperature between 900° and 1200° C., for a period between 1 minute and 10 hours, preferably between 10 minutes and 1 hour.

A second possible series of steps comprises at least the successive steps described below.

a) at least one assembly is wound so as to obtain at least one cylinder. This step is identical to step a) of the first series of steps.

b) optionally at least one cylinder is compressed. This step is identical to step b) of the first series of steps.

c) at least one optionally compressed cylinder is introduced into a suitable tube. The introduction of at least one cylinder into said tube is done in the same way as the introduction of at least one cylinder described in step d) of the first series of steps.

d) the assembly contained in the tube is rendered coherent by at least by at least one of the following operations: brazing, soldering, sintering. This step is performed in a manner that is identical to step e) of the first series of steps.

e) the unit formed by the tube comprising at least one optionally compressed cylinder undergoes a treatment aiming at transforming the major portion of the aluminum included in the assembly into alumina. The treatment is performed in the same way as the treatment described in step c) of the first series of steps.

Finally, the invention relates to a catalyst characterized in that it comprises an assembly of at least one wire which comprises at least, in % weight, between 60 and 90% iron, between 10 and 254 chromium, and up to 10%, preferably up to 6% aluminum, at least one metal selected from the group formed by platinum, rhodium, palladium, ruthenium, iridium, gold and silver having been deposited on the assembly, the outside contour of the cross-section of the wire being included in a ring whose area is between a circle with a 90 μm diameter and a circle with a 5 mm diameter, the length of the wire being at least equal to 20 cm, and the assembly being mechanically integral. It is possible that the assembly is coated before the depositing of metal or during said depositing, the layer of coating consisting mainly of at least one compound selected from the group formed by aluminum oxides, cerium oxides, titanium oxides, silicon oxides, vanadium oxides and optionally comprising at least one compound of an element selected from the group formed by lanthanum, barium, iron and zirconium, the aluminum having been previously deposited on the wire by immersion, followed by redrawing.

A preferred form of the invention relates to a catalyst such that the assembly is, prior to the optional step of coating or to the step of depositing at least one metal having a catalytic activity, subjected to the following series of steps: a) at least one assembly is wound so as to obtain at least one cylinder; b) at least one cylinder undergoes a treatment aiming at transforming a certain portion of the aluminum into alumina; c) at least one cylinder containing alumina is introduced into a tube; d) the assembly contained in the tube is rendered coherent by at least one of the following operations: brazing, soldering or sintering, an additional intermediate step of compression of the cylinder having been optionally performed between steps a) and b) described above.

Thus a preferred form of the invention relates therefore to a catalyst with a base of at least one wire containing iron, chromium and aluminum, the wire being assembled by knitting and/or weaving, then, after winding and compression, the aluminum is transformed into alumina; then, after shaping in a tube, the assembly is rendered coherent by brazing and/or soldering and/or sintering; finally, after optional depositing of a coating layer, a metal having a catalytic activity is deposited on the assembly.

Another preferred form of the invention relates to a catalyst such that the assembly is, prior to the coating step or to the step of depositing at least one metal having a catalytic activity, subjected to the following series of steps:

a) at least one assembly is wound so as to obtain at least one cylinder b) at least one cylinder is introduced into a tube c) the assembly present in the tube is rendered coherent by at least one of the following operations: brazing, soldering or sintering d) the assembly present in the tube undergoes a treatment aiming at transforming a certain portion of the aluminum into alumina, an additional intermediate step of compression of the cylinder having been optionally performed between steps a) and b) described above.

Thus, another preferred embodiment of the invention also relates to a catalyst having a base of at least one wire containing iron, chromium and aluminum, the wire being assembled by knitting and/or weaving, then, after winding and optional compression, the assembly is shaped in a tube and rendered coherent by brazing and/or soldering and/or sintering; then, the assembly is treated in such a way that a certain portion of the aluminum is transformed into alumina; finally after optional depositing of a coating layer, at least one metal having a catalytic activity is deposited on the assembly.

Finally, one of the preferred assemblies according to the invention is at least partially a knitted assembly. Another of the assemblies preferred according to the invention is at least partially a woven assembly.

A use of the catalyst according to the invention relates to combustion catalysis. Another use of the catalyst according to the invention relates to post-combustion catalysis.

In a catalytic converter according to the invention in the preferred embodiments described above, an improved conversion of pollutants is obtained as a result of obtaining a flow of gases that is more turbulent than for catalytic converters described in the prior art.

BRIEF DESCRIPTION OF THE DRAWINGS

The attached figures partially illustrate the invention without however limiting its scope.

FIG. 1 represents one of the preferred assemblies of this invention which corresponds to a knitted structure (1) in the shape of a "sock." The wires used for the knitting of said sock have, in the case of FIG. 1, approximately an identical shape.

FIG. 2 exhibits a profile view of another of the preferred assemblies of this invention, namely two fabrics (2) and (3) of which one, (2), has undergone a partial embossing.

FIGS. 3 and 4 exhibit two cylinders before compression according to the invention, one, (4), having been made by winding the sock of FIG. 1, and the other, (5), having been made from fabrics (2) and (3) which have been superposed (see FIG. 2) then wound simultaneously.

FIG. 5 exhibits the way in which it is possible to place several cylinders of the type of cylinder (4) of FIG. 3 within a tube (not shown here). The cylinders are placed preferably in such a way that the gases encounter, during their passage within the tube, cylinders having decreasing voidage.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding French application No. 93/08742, filed Jul. 13, 1993, is hereby incorporated by reference.

EXAMPLES

Example 1

A wire of circular section and made of an iron-chromium alloy having 80% iron and 20% chromium, with a 0.4 mm diameter, is immersed in a bath of molten aluminum then redrawn to obtain a wire whose average composition (by weight) is: iron: 76.2%, chromium: 19.0% and aluminum 4.8%. This wire is knitted in the shape of an open and hollow cylinder with a 100 mm diameter. This cylinder is flattened between two rollers to form a strip with a width of about 140 mm. This strip is cut to such a length that its weight is 238 g. It is then wound on itself from one end to form a cylinder 140 mm long and 100 mm in diameter or a volume of 1100 cm$^3$. The voidage of this cylinder is 97%.

This cylinder is placed in an iron-chromium alloy tube with 17% chromium, with an inside diameter of 100 mm, 150 mm long and 1.5 mm thick, in such a way that each end of the tube goes beyond the cylinder about 5 mm. A nickel brazing paste is deposited at the ends of the cylinder. The unit is then introduced into a vacuum treatment furnace whose residual pressure is less than 100 Pascal. The temperature is brought to 1100° C. in 1.5 hours, then kept at this value for 1.5 hours. It is then brought back to 950° C. in one hour and kept at this value for 6 hours. In this last step, when the temperature reaches 950° C., air is gradually introduced into the furnace, so that the partial pressure reaches the ambient atmospheric pressure. The furnace is then cooled to the ambient temperature, the air pressure being kept equal to the ambient pressure.

A suspension is prepared by introducing 600 g of alumina powder having 200 m$^2$/g into 1400 g of water, and acidification by acetic acid up to pH 4.5. The average grain size of the suspension is brought from 15 to 2.5 µm by grinding in a ball mill. The tube containing the cylinder of wires and having undergone the brazing and the previously described heat treatments, is dipped in the suspension, then drained and blown to drive out the poorly attached excess suspension. It is then introduced into a furnace which is brought to a temperature of 500° C. in 2 hours, then kept at this temperature for 4 hours. The operation is repeated twice so that the weight of coated alumina reaches 52 g. The coated part is then dipped in a solution of dinitrosodiamino platinum, then lifted from the solution, drained and blown. It is then introduced to the air in a furnace whose temperature is brought to 500° C. in 2 hours then kept at this temperature for 4 hours. After cooling, the tube containing the cylinder of wires coated with alumina and impregnated with platinum constitutes a catalytic converter containing 1.165 g of platinum referenced A.

Example 2

From an iron (80%)—chromium (20%) alloy wire with a 0.2 mm diameter, an immersion is performed as in example 1 in a bath of molten aluminum then a redrawing, to obtain a wire exhibiting the following average composition: iron 75.7%; chromium 18.9%, aluminum 5.4%. This wire is woven in the shape of a strip 150 mm wide. This strip is embossed by passage between two embossed wheels creating ripples 2 mm deep, 10 mm apart.

This strip is folded in three to obtain a new strip with a width of about 50 mm formed with three superposed layers. This new strip is cut to such a length that the weight of the cut part is 57 g; it is wound on itself from one end to form a cylinder 100 mm in diameter and about 50 mm long, or a volume of about 393 cm$^3$. The voidage of this cylinder is 98%.

Two other cylinders are prepared in an identical manner but the weight of the cut portion is, for each of them, 85 g, corresponding to a porosity of 97%.

These cylinders are successively introduced into an iron-chromium alloy tube having 17% chromium, with an inside diameter of 100 mm, 160 mm long and 1.5 mm thick, in such a way that the ends of the tube go beyond those of the cylinder by about 5 mm. The cylinder with 98% voidage is placed at one end of the tube. The part thus produced is then treated as in example 1, first of all by application of a nickel brazing paste, then heat treatment at 1100° and 950° C. under vacuum, then in the presence of air.

As in example 1, a suspension is prepared of alumina in water acidified by acetic acid, and the part containing the three cylinders is coated. The operation is repeated twice so that the weight of coated alumina reaches 88 g.

As in example 1, the coated part is then impregnated by a solution of dinitrosodiamino platinum, then treated in air at 500° C. for 2 hours. The tube containing the cylinders of wires coated with alumina and impregnated with platinum constitutes a catalytic converter containing 1.664 g of platinum, and referenced B.

Example 3

The same wire as in example 2 is used. This wire is woven in the shape of a strip 150 mm wide. As in example 2, this strip is folded in three to obtain a new strip 50 mm wide. The latter is embossed by passing between two embossed wheels creating ripples 2 mm deep, 10 mm apart.

The elemental composition of the strip is then 76.2% iron, 19.0% chromium and 4.8% aluminum.

This strip is cut to a such a length that its weight is 56 g, then wound to form a cylinder 100 mm in diameter and about 50 mm long, or a volume of about 393 cm$^3$. The voidage of this cylinder is 98%.

Two other cylinders are prepared in an identical manner but the weight of the cut portion is, for each of them, 84 g, corresponding to a porosity of 97%.

As in example 2, these three cylinders are successively introduced into an iron-chromium alloy tube with an inside diameter of 100 mm, 160 mm long, the cylinder with 98% voidage being placed at one end of the tube.

As in example 1, a suspension is prepared of alumina in water acidified by acetic acid and the part containing the three cylinders is coated. The operation is repeated twice so that the weight of coated alumina reaches 86 g.

The part is then impregnated by a solution of dinitrosodiamino platinum in a manner identical to the part described in example 2, to obtain a catalytic converter containing 1.664 g of platinum referenced C.

Example 4

As in example 3, a 150 mm wide strip is prepared, which is folded in three, then embossed.

This strip is cut to three different lengths corresponding to weights of 112, 84 and 56 g, resulting, after winding in the shape of a cylinder 100 mm in diameter and 50 mm long, in voidages of 96, 97 and 98%, respectively.

As in example 2, these three cylinders are successively introduced into an iron-chromium alloy tube with an inside diameter of 100 mm and 160 mm long, the cylinder with 97% voidage being placed between the other two.

As in example 1, a suspension is prepared of alumina in water acidified by acetic acid and the part containing the three cylinders is coated. The operation is repeated twice so that the weight of coated alumina reaches 84 g.

The part is then impregnated by a solution of dinitrosodiamino platinum in a manner identical to the part described in example 2, to obtain a catalytic converter containing 1.664 g of platinum, referenced D.

Example 5

As in example 4, a 150 mm wide strip is prepared, which is folded in three to obtain a new 50 mm wide strip, then embossed.

This strip is cut to a length corresponding to a weight of 27.4 g, resulting, after winding in the shape of a cylinder 70 mm in diameter and 50 mm long, in a voidage of 98%.

This cylinder is introduced into an iron-chromium alloy tube with an inside diameter of 70 mm, 60 mm long.

As in example 1, the unit is brazed, then treated in vacuum at 1100° C., then in air at 950° C.

A suspension is prepared by introduction of 500 g of alumina powder having 200 m²/g and of 100 g of ceric oxide powder into 1400 g of water, and acidification by acetic acid up to pH 4.5. The average grain size of the suspension is brought back from 18 μm to 2.5 μm by grinding in a ball mill. As in example 1, the tube containing the cylinders of wires is dipped in the suspension, then blown and brought to a temperature of 500° C. during 4 hours. The operation is repeated twice so that the weight of the coating of alumina and ceric oxide reaches 56 g.

The part is then dipped in a solution of dinitrosodiamino platinum and rhodium nitrate, then lifted from the solution, drained and blown. As in example 1, it is then introduced into a furnace whose temperature is brought to 500° C., then kept at this temperature for 4 hours. After cooling, a catalytic converter referenced E is obtained that contains 0.226 g of platinum and 0.045 g of rhodium.

Example 6

The performances of catalytic converters A to D are determined on an engine bench equipped with a diesel engine with 1.9 liters of displacement operating at a speed of 2500 RPM and a power of 15 kW. The catalytic converters are installed on an exhaust line 1.5 meters from the manifold. The temperature at the intake of the catalytic converters is 320° C.

The conversion of the pollutants is expressed by the ratio of the difference of the concentrations between the upstream and downstream of the catalyst to the upstream concentration of the catalyst. It requires the measurement of the concentration of pollutants upstream and downstream from the catalyst.

The concentration of hydrocarbons is determined using a flame ionization analyzer.

The concentration of particles is determined from the weight increase of a filter kept at 52° C. and flushed by a mixture of exhaust gas and air prepared in a dilution microtunnel.

The determination of the concentration of the particles is done using a dilution microtunnel and a thermostat filter. A portion of the exhaust gas is mixed with the air in the dilution microtunnel, then sent to the filter whose weight increase makes it possible to get back to the weight flow of particles and to their concentration.

The following table presents the results obtained for the 4 catalytic converters A to D.

| Reference of the caralytic converter | Conversion of the HC's | Conversion of the particles |
| --- | --- | --- |
| A | 66% | 25% |
| B | 71% | 28% |
| C | 71% | 27% |
| D | 67% | 25% |

Example 7

Catalytic converter E is mounted 0.80 meter from the manifold, on the exhaust line of a spark ignition engine with 1.9 liter displacement operating in looped regulation of richness.

The performance of the catalytic converter are determined by the measurement of the conversions of carbon monoxide (CO), nitrogen oxides ($NO_x$) and hydrocarbons (HC) through the catalytic converter, the engine operating in stationary conditions at a speed of 2500 RPM and a power of 10 kW. The temperature of the exhaust gases is 530° C. at the intake of the catalyst. The conversions are calculated from concentrations measured upstream and downstream from the catalytic converter using an infrared analyzer for the CO, a chemiluminescence analyzer for the $NO_x$'s and a flame ionization analyzer for the HC's.

The following table indicates the conversions of CO, $NO_x$ and HC.

| Pollutant | CO | $NO_x$ | HC |
| --- | --- | --- | --- |
| Conversion | 98% | 85% | 96% |

This performance is very good, considering the small size of the catalytic converter.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A catalyst comprising an assembly of at least one wire that comprises, by weight, about 60 to 90% iron, about 10 to 25% chromium, and up to about 10% aluminum, and deposited on the wire at least one metal which is platinum, rhodium, palladium, ruthenium, iridium, gold or silver the wire having a cross-section with an outside contour whose area ranges between that of a circle with about a 90 μm diameter and a circle with about a 5 mm diameter, the length of the wire being at least equal to about 20 cm, and wherein, prior to production of the assembly, aluminum is deposited on at least a portion of the assembly followed by redrawing of the wire.

2. A catalyst according to claim 1, wherein the assembly is coated before or during deposition of the platinum, rhodium, palladium, ruthenium, iridium, gold or silver with a layer comprising at least one of an aluminum oxide, a cerium oxide, a titanium oxide, a silicon oxide, or a vanadium oxide said layer optionally further comprising at least one compound of lanthanum, barium, iron or zirconium.

3. A catalyst according to claim 1, wherein the assembly is, prior to the metal depositing step subjected to the following:

a) winding said assembly so as to obtain at least one cylinder, b) treating said cylinder to transform at least a portion of the aluminum present into alumina, c) introducing said cylinder containing alumina into a tube, d) rendering the cylinder contained in the tube coherent by brazing, soldering or sintering.

4. A catalyst according to 1, wherein the assembly is, prior to the metal depositing step subjected to the following:

a) winding the assembly so as to obtain at least one cylinder, b) introducing said cylinder into a tube, c) rendering the cylinder in the tube coherent by brazing, soldering or sintering, d) treating the cylinder present in the tube to transform at least a portion of the aluminum present into alumina.

5. A catalyst according to claim 3 wherein, in between (a) and (b), the cylinder is compressed.

6. A catalyst according to claim 1 wherein the assembly is at least partially knitted or woven.

7. A catalyst according to claim 2, wherein the assembly is, prior to the coating step, subjected to the following:

a) winding so as to obtain at least one cylinder, b) treating said cylinder to transform at least a portion of the aluminum present into alumina, c) introducing said cylinder containing alumina into a tube, d) rendering the cylinder contained in the tube coherent by brazing, soldering or sintering.

8. A catalyst according to claim 4, wherein in between (a) and (b), the cylinder is compressed.

9. A catalyst according to claim 6, wherein the wire is spirally wound to a substantially cylindrical shape.

* * * * *